(12) United States Patent
Iwaji et al.

(10) Patent No.: US 8,766,575 B2
(45) Date of Patent: Jul. 1, 2014

(54) SYNCHRONOUS ELECTRIC MOTOR DRIVE SYSTEM

(75) Inventors: Yoshitaka Iwaji, Hitachinaka (JP); Shigehisa Aoyagi, Hitachinaka (JP); Kazuaki Tobari, Hitachiota (JP); Ryoichi Takahata, Hitachi (JP)

(73) Assignees: Hitachi Automotive Systems, Ltd., Hitachinaka-shi (JP); Hitachi Car Engineering Co., Ltd., Hitachinaka-shi (JP)

( * ) Notice: Subject to any disclaimer, the term of this patent is extended or adjusted under 35 U.S.C. 154(b) by 0 days.

(21) Appl. No.: 13/816,296

(22) PCT Filed: Jul. 26, 2011

(86) PCT No.: PCT/JP2011/067002
§ 371 (c)(1),
(2), (4) Date: Apr. 5, 2013

(87) PCT Pub. No.: WO2012/029451
PCT Pub. Date: Mar. 8, 2012

(65) Prior Publication Data
US 2013/0243625 A1 Sep. 19, 2013

(30) Foreign Application Priority Data
Sep. 2, 2010 (JP) .................................. 2010-196885

(51) Int. Cl.
*H02P 6/18* (2006.01)

(52) U.S. Cl.
USPC ................ 318/400.17; 318/400.2; 318/400.34

(58) Field of Classification Search
CPC .......... H02M 1/4233; H02M 7/53871; H02M 7/5388; H02P 6/001; H02P 7/0044; H02P 7/2815; H02P 7/29

USPC .............. 318/700, 400.01, 400.17, 400.2, 318/400.32, 400.34, 400.36
See application file for complete search history.

(56) References Cited

U.S. PATENT DOCUMENTS

| 4,597,037 A | * | 6/1986 | Okado | ............................. 363/41 |
| 4,766,921 A | * | 8/1988 | Williams | ........................... 137/1 |

(Continued)

FOREIGN PATENT DOCUMENTS

| JP | 2009-189176 A | 8/2009 |
| JP | 2009-278788 A | 11/2009 |

OTHER PUBLICATIONS

International Preliminary Report on Patentability (PCT/IB/338 & PCT/IB/373) dated Mar. 14, 2013 (five (5) pages).

(Continued)

*Primary Examiner* — Bentsu Ro
(74) *Attorney, Agent, or Firm* — Crowell & Moring LLP

(57) ABSTRACT

A synchronous electric motor drive system capable of driving at speeds near zero is provided. An energization mode determination unit switches six energization modes successively based on a terminal potential detected of the de-energized phase of a three-phase synchronous electric motor or on a stator winding wire connection point potential (neutral point potential) detected of the three-phase synchronous transmission unit. A voltage command correction unit corrects by a correction amount ΔV an applied voltage command destined for the synchronous electric motor to supply the synchronous electric motor with a repeated waveform of a positive pulse, negative pulse, and zero voltage as a line voltage waveform of the energized phases in each of the six energization modes, the positive pulse voltage being polarized to cause the synchronous electric motor to generate a forward rotation torque, the negative pulse voltage causing the synchronous electric motor to generate a reverse rotation torque.

10 Claims, 13 Drawing Sheets

(56) References Cited

U.S. PATENT DOCUMENTS

| | | | | |
|---|---|---|---|---|
| 5,506,765 | A | * | 4/1996 | Nakata et al. .................... 363/98 |
| 7,095,204 | B2 | * | 8/2006 | Lee et al. ....................... 318/700 |
| 8,258,732 | B2 | | 9/2012 | Iwaji et al. |
| 2009/0200971 | A1 | | 8/2009 | Iwaji et al. |
| 2010/0253260 | A1 | | 10/2010 | Doyama et al. |

OTHER PUBLICATIONS

Corresponding International Search Report with English Translation dated Nov. 1, 2011 (three (3) pages).

Japanese-language Written Opinion dated Nov. 1, 2011 (PCT/ISA/237) (three (3) pages).

* cited by examiner

SYNCHRONOUS ELECTRIC MOTOR DRIVE SYSTEM

TECHNICAL FIELD

The present invention relates to a synchronous electric motor drive system. More particularly, the invention relates to a drive system for controlling a synchronous electric motor by estimating the magnetic pole positions of its rotor on a sensorless basis.

BACKGROUND ART

In such industrial sectors as household electrical industries, manufacturing industries and automotive industries, motor drive units are used to provide rotating speed control, torque assist control, and positioning control of fans, pumps, compressors, conveyors, lifts, etc. In these sectors, small-sized highly efficient permanent magnetic motors (synchronous electric motors) are used extensively as the motor drive units. However, to drive the permanent magnet motor (called the PM motor hereunder) requires information about the magnetic pole positions of the motor rotor. This requirement makes position sensors such as resolvers and IC's indispensable. Recent years have seen widespread acceptance of so-called "sensorless control" schemes controlling the rotating speed and torque of PM motors without using position sensors.

Implementing sensorless control offers considerable benefits: it lowers the cost involved with position sensors (i.e., sensors themselves and their wiring). Also, with the sensors eliminated, the drive unit is made that much smaller and may be used in harsher conditions than before.

Today, the sensorless control of PM motors is implemented by adopting a number of techniques. One involves directly detecting the induced voltage generated by rotor revolutions (i.e., speed-induced voltage) and using the detected voltage as rotor position information for driving the PM motor. Also adopted is a position estimation technique for estimating by calculation the rotor positions based on a mathematical model of the motor of interest.

A big problem with the above-mentioned sensorless control techniques is how to detect positions at low-speed operation time. Most of the sensorless control schemes implemented today are based on the inducted voltage generated by the PM motor (speed-induced voltage). That means sensitivity is bound to drop in stopped or low-speed ranges where the induced voltage is low, leaving the position information buried in noise.

Meanwhile, there is a known position sensorless technique for use in low-speed ranges on the basis of 120-degree energizing control over the PM motor. This kind of technique can control the PM motor in speed ranges in which the induced voltage is low (e.g., see Patent Literature 1).

PRIOR ART LITERATURE

Patent Literature

Patent Literature 1: JP-2009-189176-A

SUMMARY OF THE INVENTION

Technical Problem

However, although the technique described in the cited Patent Literature 1 offers good control performance when the motor is in a stopped or low-speed state, there may occur a step-out if the rotor rotates in reverse direction under a reverse torque due to an external shock or the like during low-speed drive. Also, this technique is not usable where it is desired to control the PM motor to rotate in normal direction or in reverse at speeds near zero.

It is thus an object of the present invention to provide a synchronous electric motor drive system capable of driving a synchronous electric motor at speeds near zero.

Means for Solving the Problem (1) In order to accomplish the above-described object of the present invention, there is provided a synchronous electric motor drive system including: a three-phase synchronous electric motor; an inverter supplying alternate-current power to the three-phase synchronous electric motor and including a plurality of switching elements; and a controller controlling energization of the inverter through pulse width modulation in one of six energization modes by selecting two phases to be energized out of three phases of winding wires of the three-phase synchronous electric motor. In the system, the controller has an energization mode determination unit for switching the energization modes successively based on a terminal potential value detected of the de-energized phase of the three-phase synchronous electric motor or on a stator winding wire connection point potential value (neutral point potential) detected of the three-phase synchronous transmission unit. Further, the controller has a voltage command correction unit for correcting an applied voltage command destined for the synchronous electric motor so as to supply the synchronous electric motor with a repeated waveform of a positive pulse voltage, a negative pulse voltage, and a zero voltage as a line voltage waveform of the energized phases in each of the six energization modes. The positive pulse voltage is polarized to cause the synchronous electric motor to generate a forward rotation torque, the negative pulse voltage causing the synchronous electric motor to generate a reverse rotation torque. Still further, the line voltage of the energized phases is applied to the synchronous electric motor.

The above configuration allows the synchronous electric motor to be driven at speeds near zero.

(2) Preferably in regard to paragraph (1) above, there may further be included a mode switching trigger generator. The mode switching trigger generator may sample the detected terminal potential value of the de-energized phase or the detected stator winding wire connection point potential value (neutral point potential) of the three-phase synchronous transmission unit in synchronism with the positive and the negative pulse voltages of the energized phases. Then, the mode switching trigger generator may compare the sampled values in level with corresponding reference voltages and, based on a result of the level comparison, the mode switching trigger generator may output a mode switching trigger signal that instructs successive switching of the energization modes between forward direction mode and reverse direction mode. The energization mode determination unit of the controller may switch the energization modes successively based on the mode switching trigger signal output from the mode switching trigger generator.

(3) Preferably in regard to paragraph (1) above, the controller may include a PWM generator for performing pulse width modulation by comparing a triangular wave carrier with voltage commands corresponding to the applied voltages to the two energized phases, and the voltage command correction unit may generate the positive and the negative pulse voltages by applying a correction voltage to the voltage commands for the two energized phases.

(4) Preferably in regard to paragraph (1) above, the controller may output the positive and the negative pulse voltages alternately in each of the six energization modes while outputting a zero voltage to the synchronous electric motor between pulse trains of the positive and the negative pulse voltages.

(5) Preferably in regard to paragraph (1) above, in each of the six energization modes, the controller may repeatedly apply either the positive pulse voltage and a zero voltage or the negative pulse voltage and a zero voltage to the synchronous electric motor while applying to the synchronous electric motor, after applying the voltages in combination a plurality of times, a pulse voltage of which the polarity is opposite the positive or the negative pulse voltage.

(6) Preferably in regard to paragraph (4) or (5) above, upon gradually accelerating the synchronous electric motor from low speeds in normal direction, the controller may gradually widen the pulse width of the positive pulse voltage for acceleration without changing the pulse width of the negative pulse voltage for the energized phases, before gradually narrowing the negative pulse width for acceleration in normal direction; and upon gradually accelerating the synchronous electric motor from low speeds in reverse direction, the controller may gradually widen the pulse width of the negative pulse voltage for acceleration without substantially changing the pulse width of the positive pulse voltage for the energized phases, before gradually narrowing the positive pulse width for acceleration in reverse direction.

(7) Preferably in regard to paragraph (1) above, the controller may be implemented using a microprocessor; and two switching devices of which the phase corresponds to the de-energized phase of the inverter may be switched off using complementary operations of a three-phase PWM function provided by the microprocessor and also using an externally attached gate array circuit.

(8) Preferably in regard to paragraph (1) above, the controller may be implemented using a single-chip microcomputer; and the single-chip microcomputer may perform control in such a manner that, of six gate signals output from the controller to the inverter, those signals corresponding to the two energized phase are pulses causing an upper and a lower switching element to operate in complementary fashion and the remaining signals corresponding to the de-energized phase switch off the upper and the lower switching elements.

(9) Preferably in regard to paragraph (1) above, there may be provided a synchronous electric motor drive system described in paragraph (1) wherein an electrically-powered hydraulic pump may be driven as a load of the synchronous electric motor.

Effect of the Invention

According to the present invention, it is possible to implement driving at speeds near zero.

MODE FOR CARRYING OUT THE INVENTION

Explained below in reference to FIGS. 1 through 23 are configurations and operations of the synchronous electric motor drive system as one embodiment of the present invention.

Figure 1:
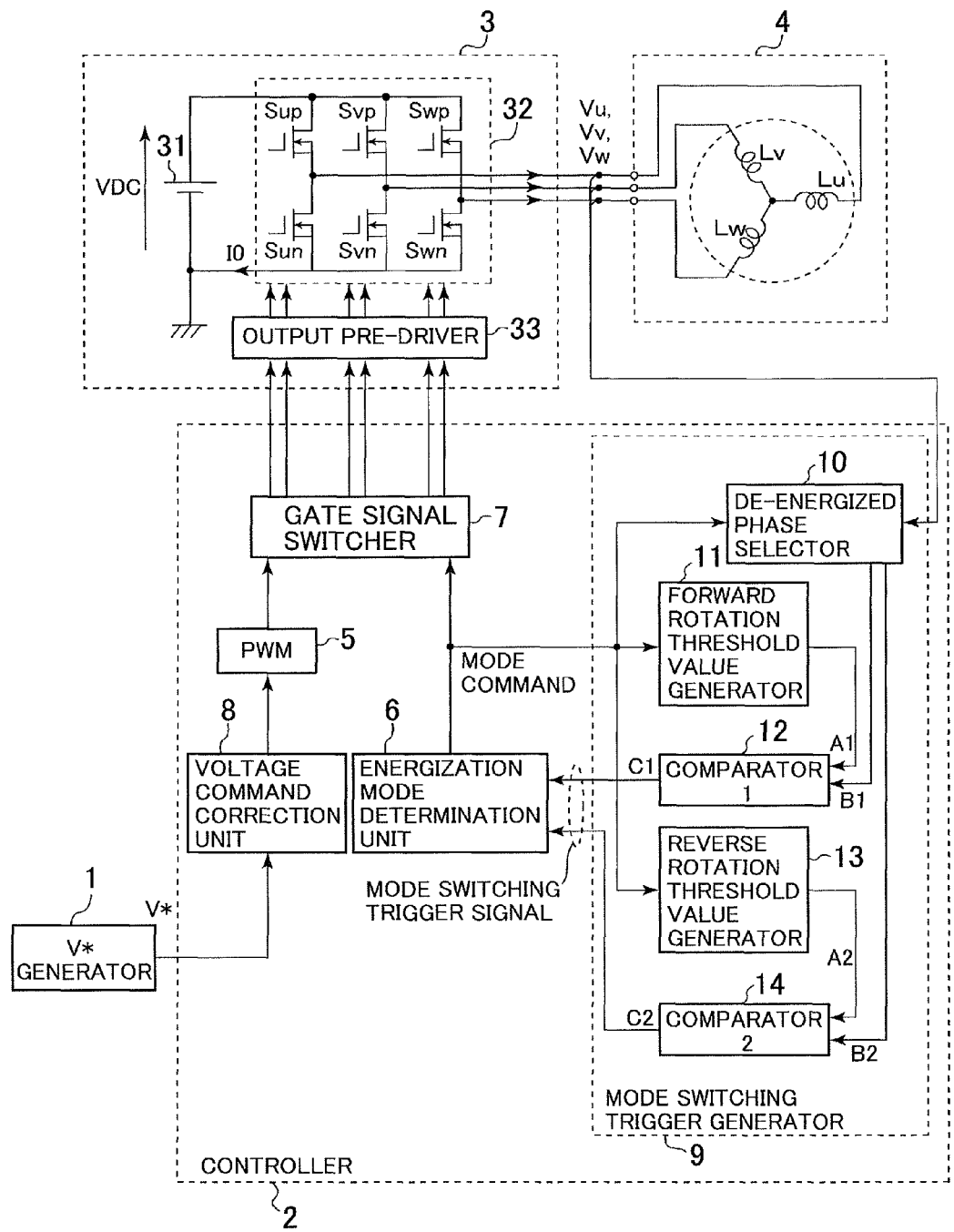
FIG. 1 is a block diagram showing an overall configuration of a synchronous electric motor drive system as one embodiment of the present invention.

First of all, an overall configuration of the synchronous electric motor drive system embodying the invention is explained in reference to FIG. 1.

FIG. 1 is a block diagram showing an overall configuration of a synchronous electric motor drive system as one embodiment of the present invention.

The synchronous electric motor drive system of this embodiment includes a voltage command generator (V* generator) 1, a controller 2, an inverter 3, and a synchronous electric motor (PM motor) 4.

The PM motor 4 is a three-phase synchronous electric motor that has a plurality of permanent magnets attached to its rotor.

The V* generator 1 is a controller which generates an applied voltage command V* destined for the PM motor 4 and which is installed hierarchically higher than the controller 2. For example, when the current of the PM motor 4 is controlled, the output of the V* generator may be regarded as the output of a current controller. The controller 2 works to apply the voltage corresponding to the command V* to the PM motor 4 by performing pulse width modulation (PWM). For example, if the V* generator 1 generates a positive applied voltage command V*, the PM motor 4 rotates in normal direction; if the V* generator 1 generates a negative applied voltage command V*, the PM motor 4 rotates in reverse direction. This embodiment is configured to have the controller 2 support the negative applied voltage command V* so that the PM motor 4 may rotate in reverse direction when supplied with the negative applied voltage command V.

Based on the applied voltage command V*, the controller 2 computes the applied voltage destined for the PM motor 4 so as to generate a pulse width modulation wave (PWM) signal to the inverter 3. The controller 2 has a PWM generator 5, an energization mode determination unit 6, a gate signal switcher 7, a voltage command correction unit 8, and a mode switching trigger generator 9. This embodiment is characterized by a structure made up of the voltage command correction unit 8 and of a reverse rotation threshold value generator 13 and a comparator 14 included in the mode switching trigger generator 9.

The voltage command correction unit 8 corrects the applied voltage command V* generated by the V* generator 1 and destined for the PM motor 4. By correcting the applied voltage command V*, the voltage command correction unit 8 can prevent a step-out in the event of a reverse turn during forward rotation and may permit reverse rotation. A detailed structure of the voltage command correction unit 8 will be explained later in reference to FIG. 3 and the operation of this unit 8 will be discussed later in reference to FIGS. 4 and 6 through 13. If no correction is made by the voltage command correction unit 8, the applied voltage command V* from the V* generator 1 is fed unmodified to the PWM generator 5. Where the PM motor 4 rotates at low speeds in normal or reverse direction, the voltage command correction unit 8 corrects the applied voltage command V* generated by the V* generation 1 and destined for the PM motor 4.

The PWM generator 5 generates a pulse width-modulated PWM wave based on the output of the V* generator 1 following correction by the voltage command correction unit 8.

The gate signal switcher 7 switches PWM wave destinations so that the PWM wave generated by the PWM generator 5 may be supplied to two out of six switching elements Sup, Sun, Svp, Svn, Swp and Swn of the inverter 3. The destinations thus switched are determined on the basis of commands from the energization mode determination unit 6, to be discussed later.

Detailed structures of the PWM generator 5 and gate signal switcher 7 will be explained later in reference to FIG. 5, and the operations of these units 5 and 7 will be discussed later in reference to FIGS. 6 through 13.

The energization mode determination unit 6 successively outputs mode commands for determining six switching modes of an inverter main circuit part 3. The energization mode determination unit 6 switches energization modes based on the signals generated by the mode switching trigger generator 9.

The mode switching trigger generator 9 generates trigger signals for switching the energization modes. The mode switching trigger generator 9 includes a de-energized phase selector 10, a forward rotation threshold value generator 11, a comparator 12, a reverse rotation threshold value generator 13, and a comparator 14. The de-energized phase selector 10 selects the de-energized phase based on a mode command output from the energization mode determination unit 6, and samples the de-energized phase potential. The de-energized phase selector 10 will be discussed later in detail with reference to FIG. 13. The forward rotation threshold value generator 11 generates a voltage constituting a forward rotation threshold value with regard to the induced voltage of the PM motor 4. The comparator 12 compares the de-energized phase voltage with the forward rotation threshold value, and generates accordingly a mode switching trigger signal for forward rotation. The forward rotation threshold value generator 11 and comparator 12 will be discussed later in detail with reference to FIGS. 18 and 19. The reverse rotation threshold value generator 13 generates a voltage constituting a reverse rotation threshold value with regard to the induced voltage of the PM motor 4. The comparator 14 compares the de-energized phase voltage with the reverse rotation threshold value, and generates accordingly a mode switching trigger signal for reverse rotation. The reverse rotation threshold value generator 13 and comparator 14 will be discussed later in detail with reference to FIGS. 16 and 17.

Given the PWM signal from the controller 2, the inverter 3 generates a three-phase AC voltage from the DC voltage of a DC power source 31. The three-phase AC voltage thus generated controls the PM motor 4. The inverter 3 includes the DC power source 31 for supplying power to the inverter; an inverter main circuit part 32 made up of six switching elements Sup, Sun, Svp, Svn, Swp and Swn; and an output pre-driver 33 for directly driving the inverter main circuit part 32.

The switching element Sup is a U-phase upper arm switching element, and the switching element Sun is a U-phase lower arm switching element. The two switching elements are connected in series. A midpoint between the switching elements Sup and Sun is connected to a U-phase coil Lu of the PM motor 4.

The switching element Svp is a V-phase upper arm switching element, and the switching element Svn is a V-phase lower arm switching element. The two switching elements are connected in series. A midpoint between the switching elements Svp and Svn is connected to a V-phase coil Lv of the PM motor 4.

The switching element Swp is a W-phase upper arm switching element, and the switching element Swn is a W-phase lower arm switching element. The two switching elements are connected in series. A midpoint between the switching elements Swp and Swn is connected to a W-phase coil Lw of the PM motor 4.

For example, when the switching elements Sup and Svn are turned on and the other switching elements are turned off, then a current flows from the U-phase coil Lu to the V-phase coil Lv. In the ensuing explanation, energization mode 1 will be a mode in which UV pulses cause the current to flow from the U-phase coil Lu to the V-phase coil Lv. As another example, when the switching elements Svp and Sun are turned on and the other switching elements are turned off, then a current flows from the V-phase coil Lv to the U-phase coil Lu in the opposite direction of the above example. In the ensuing explanation, energization mode 4 will be a mode in which VU pulses cause the current to flow from the V-phase coil Lv to the U-phase coil Lu.

There exist six combinations in each of which two out of the six switching elements Sup, Sun, Svp, Svn, Swp and Swn are turned on and the rest are turned off. The six combinations constitute six energization modes 1, 2, 3, 4, 5 and 6. In energization mode 1, UV pulses cause a current to flow from the U-phase coil Lu to the V-phase coil Lv; in energization mode 2, UW pulse cause a current to flow from the U-phase coil Lu to the W-phase coil Lw; in energization mode 3, VW pulses cause a current to flow from the V-phase coil Lv to the W-phase coil Lw; in energization mode 4, VU pulses cause a current to flow from the V-phase coil Lv to the U-phase coil Lu; in energization mode 5, WU pulses cause a current to flow from the W-phase coil Lw to the U-phase coil Lu; and in energization mode 6, WV pulses cause a current to flow from the W-phase Lw to the V-phase coil Lv.

Figure 2:
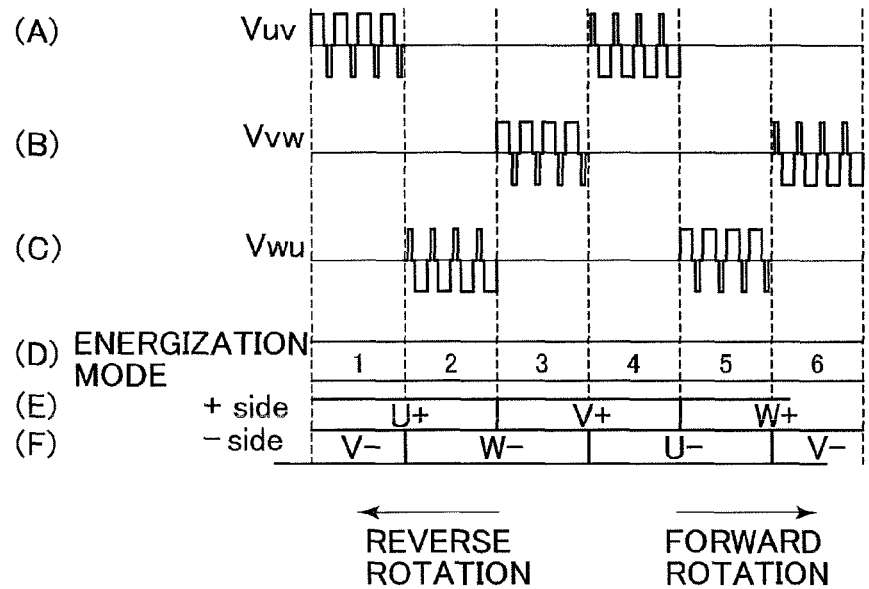
FIG. 2 is an explanatory view of line voltages fed to the two phases selected in each energization mode of the synchronous electric motor drive system as one embodiment of the present invention.

Explained next in reference to FIG. 2 are line voltages to the two phases selected in each of the energization modes of the synchronous electric motor drive system embodying the present invention.

FIG. 2 is an explanatory view of the line voltages fed to the two phases selected in each energization mode of the synchronous electric motor drive system as one embodiment of the present invention.

In FIG. 2, subfigure (A) shows the line voltage applied to the U-phase coil Lu and V-phase coil Lv; subfigure (B) shows the line voltage applied to the V-phase coil Lv and W-phase coil Lw; and subfigure (C) shows the line voltage applied to the W-phase coil Lw and U-phase coil Lu. Subfigure (D) indicates the above-mentioned six energization modes; subfigure (E) indicates the switching elements energized on the upper arm side from among the six switching elements; and subfigure (F) indicates the switching elements energized on the lower arm side from among the six switching elements.

Conventionally, as shown in FIG. 2 of Patent Literature 1, the line voltage to the two phases in the energization mode selected from multiple energization modes constitutes a positive or a negative pulse train.

By contrast, this embodiment introduces the voltage command correction unit 8 so as to apply a positive and a negative pulse alternately as the line voltage to the two phases in the energization mode selected. For example, in energization mode 3, a wide-width positive pulse is first applied followed by a narrow-width negative pulse which in turn is followed by a positive pulse, and so on. In this manner, four positive pulses and four negative pulses are applied alternately. In FIG. 2, subfigures (E) and (F) represent the switching elements energized to obtain a wide-width pulse. For example, in energization mode 3, the upper arm side switching element Svp and lower arm side switching element Swn shown in FIG. 1 are energized so as to apply a positive pulse to the motor; in order to apply a negative pulse to the motor, the upper arm side switching element Swp and lower arm side switching element Svn shown in FIG. 1 are energized. A zero potential is provided between the positive and negative pulses.

For example, in energization mode 3, a forward rotation torque is conventionally generated using only positive pulses (V-W pulses). With this embodiment, by contrast, wide-width positive pulses (V-W pulses) are each intentionally supplemented with a narrow-width negative pulse (W-V pulse) to be output. As a result, the average value of the applied voltages turns out to be a forward direction voltage that causes the motor to rotate in normal direction. However, the presence of the negative pulses makes it possible to detect an induced voltage of the rotation in reverse direction. That is, in each energization mode, forward rotation and reverse rotation can be detected simultaneously.

As indicated by arrows at the bottom of FIG. 2, the energization modes are switched from 1 to 2 to 3, . . . , to 6 to 1 and so on, in that order, when the PM motor 4 rotates in normal direction; the energization modes are switched from 6 to 5 to 4, . . . , to 1 to 6 and so on, in that order, when the PM motor 4 rotates in reverse direction.

Figure 3:
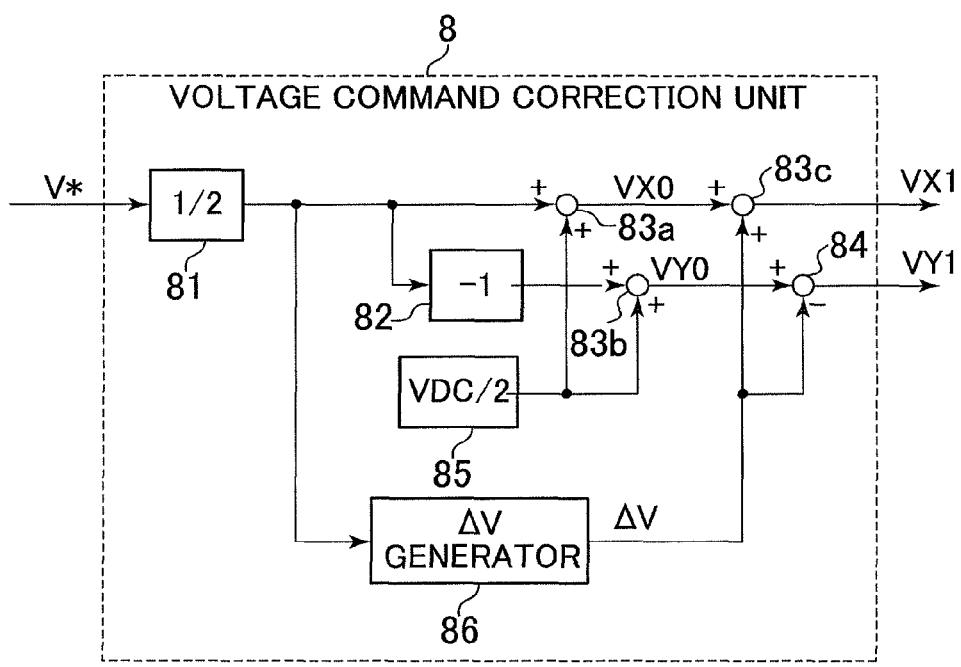
FIG. 3 is a block diagram showing a structure of a voltage command correction unit used by the synchronous electric motor drive system as one embodiment of the present invention.
Figure 4:
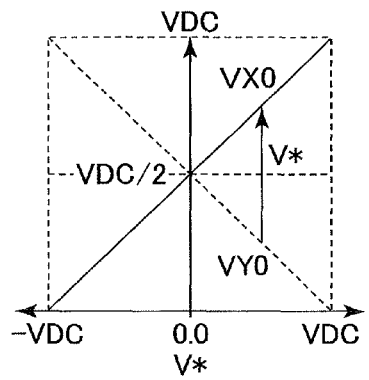
FIG. 4 is an operation explanation view of the voltage command correction unit used by the synchronous electric motor drive system as one embodiment of the present invention.

Explained next in reference to FIGS. 3 and 4 are the structure and operation of the voltage command correction unit 8 for use by the synchronous electric motor drive system embodying the present invention.

FIG. 3 is a block diagram showing a structure of a voltage command correction unit used by the synchronous electric motor drive system as one embodiment of the present invention. FIG. 4 is an operation explanation view of the voltage command correction unit used by the synchronous electric motor drive system as one embodiment of the present invention.

The voltage command correction unit 8 includes a gain multiplier 81 that halves the value of the input voltage command V* to be output, a sign inversion unit 82 that inverts the sign of the input value; adders 83a, 83b and 83c that add up the input signal; a subtractor 84 that performs subtraction; a VDC/2 generator 85 that outputs half the value of an inverter DC power source; and a ΔV generator 86 that computes the correction amount ΔV given to the voltage command V*.

At the same time that the voltage command V* is applied to the line voltage of the energized phases, the voltage command correction unit 8 corrects the command value to apply a negative pulse if the voltage command V* is positive or to apply a positive pulse if the voltage command V* is negative. For that purpose, the gain multiplier 81 is caused temporarily to halve the voltage command V*. The halved value is then supplemented with a VDC/2 output from the VDC/2 generator 85 to form a first command value VXO. On the other hand, the sign of the halved value is further inverted and the halved value with the inverted sign is supplemented with the VDC/2 from the VDC/2 generator 85 to temporarily form a second command value VYO. The command values VXO and VYO correspond to a phase voltage command for each of the two energized phases.

Explained here in reference to FIG. 4 is the relation between the voltage command V* on the one hand and the command values VXO and VYO on the other hand. As the voltage command V* becomes larger, the first command value VXO becomes greater but the second command value VYO becomes smaller. When the two command values are suitably biased using the VDC/2 generated by the VDC/2 generator 85, it is possible to output both a positive voltage and a negative voltage.

Thereafter, the adder 83c adds the correction amount ΔV to the first command value VXO while the correction amount ΔV is subtracted from the second command value VYO. The values thus computed are ultimately output as a first voltage command VX1 and a second voltage command VY1.

Figure 5:
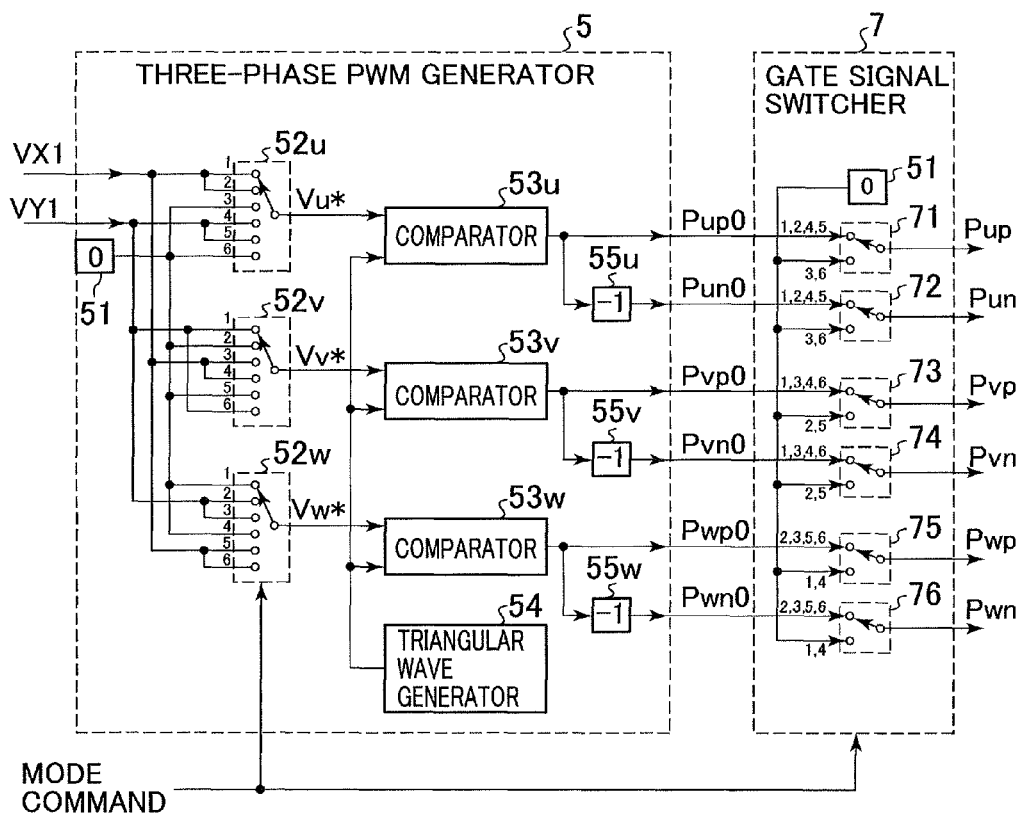
FIG. 5 is a block diagram showing structures of a three-phase PWM generator and a gate signal switcher used by the synchronous electric motor drive system as one embodiment of the present invention.

Explained next in reference to FIG. 5 are the structures and operations of the three-phase PWM generator 5 and gate signal switcher 7 for use by the synchronous electric motor drive system embodying the present invention.

FIG. 5 is a block diagram showing structures of the three-phase PWM generator and gate signal switcher used by the synchronous electric motor drive system as one embodiment of the present invention.

The three-phase PWM generator 5 includes a zero generator 51 that generates zeros; switches 52u, 52v and 52w that select the voltage command for each phase in accordance with the mode command output from the energization mode determination unit 6 shown in FIG. 1; comparators 53u, 53v and 53w that generate a pulse width modulation signal by comparing voltage commands Vu*, Vv* and Vw* for the three phases with a triangular wave carrier; a triangular wave carrier generator 54 that generates the triangular wave carrier; and sign inversion units 55u, 55v and 55w that invert the signs of PWM pulses.

Also, the gate signal switcher 7 is made up of switches 71, 7, 73, 74, 75 and 76 for switching between enable and disable of the PWM signal in accordance with the mode command output from the energization mode determination unit 6 shown in FIG. 1.

The operations of the components above are explained hereunder. The voltage commands VX1 and VY1 corrected by the voltage command correction unit 8 discussed in reference to FIG. 3 are assigned to the voltage commands for two out of the three phases. The commands are switched by the switches 52u, 52v and 52w depending on the mode in effect. The phase not energized (de-energized phase) is fed with zero for the sake of expedience and assigned the signal of the zero generator 51. For example, where the V and W phases are energized, the U phase is the de-energized phase.

In the manner described above, the voltage commands suitable for each mode are obtained. These commands are compared by the comparators 53u, 52v and 53w with the triangular wave carrier output from the triangular wave carrier generator 54, whereby PWM signals Pup0, Pun0, Pvp0, Pvn0, Pwp0 and Pwn0 are generated. For example, the PWM signals Pup0, Pvp0 and Pwp0 are assigned a PWM signal PX or PY, to be discussed later in reference to FIGS. 6 through 9; the PWM signals Pun0, Pvn0 and Pwn0 are assigned a PWM signal PXn or PYn, to be explained later also in reference to FIGS. 6 through 9. The PWM signals Pup0, Pvp0 and Pwp0 serve as gate signals for the switching elements Sup, Svp and Swp of the inverter 3, respectively; the PWM signals Pun0, Pvn0 and Pwn0 act as gate signals for the switching elements Sun, Svn and Swn of the inverter 3, respectively. Because the upper and lower switches of these switching elements are operated in complementary fashion by the sign inversion unit 55, the de-energized phase cannot be obtained in the current state. Thus the switches 71 through 76 are set to zero so as to forcibly turn off the upper and lower switching elements simultaneously. This makes it possible to generate the de-energized phase while the complementary function based on triangular wave comparison is left intact.

Explained next in reference to FIGS. 6 through 9 and 10 through 13 are the operations of the voltage command correction unit 8 and three-phase PWM generator 5 for use by the synchronous electric motor drive system embodying the present invention.

FIGS. 6 through 9 are timing charts showing operations of the voltage command correction unit and three-phase PWM generator used by the synchronous electric motor drive system as one embodiment of the present invention. FIGS. 10 through 13 are timing charts showing three-phase PWM signals in effect when the correction amount is varied on the voltage command correction unit used by the synchronous electric motor drive system as one embodiment of the present invention.

FIGS. 6 through 9 illustrate waveform changes caused by the addition of the correction amount ΔV by the voltage command correction unit 8.

Figure 6:
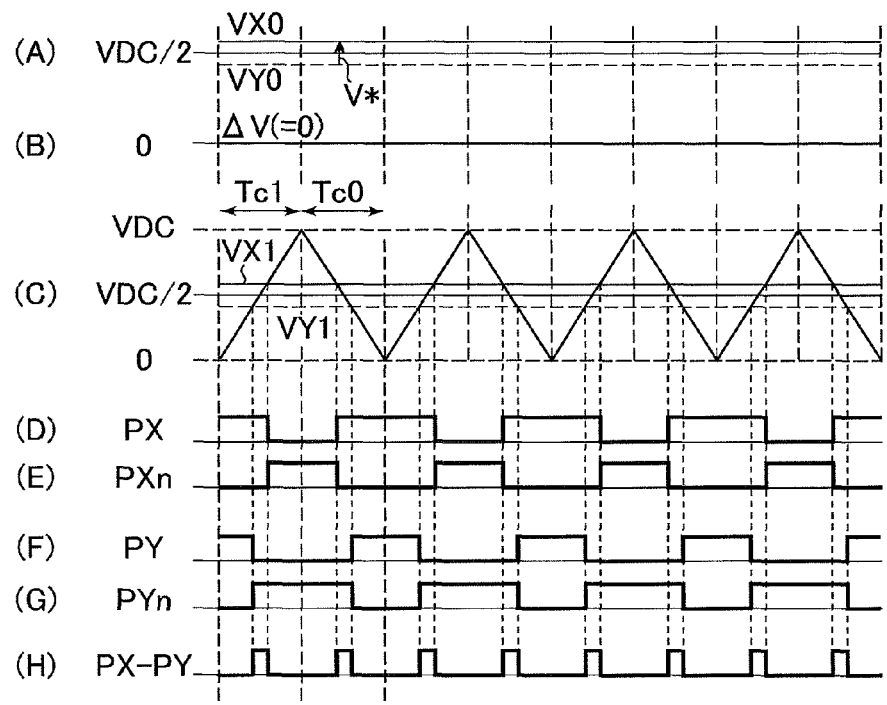
FIG. 6 is a timing chart showing operations of the voltage command correction unit and three-phase PWM generator used by the synchronous electric motor drive system as one embodiment of the present invention.

FIG. 6 shows how PWM signals are generated when no correction is performed (ΔV=0). In FIG. 6, subfigure (A) indicates command values VX0 and VY0 that are internal to the voltage command correction unit 8. Adding the correction voltage ΔV to these values would provide the voltage commands VX1 and VY1. However, in the example of FIG. 6, the voltage commands VX1 and VY1 have the same waveforms as those of the command values VX0 and VY0 as shown in subfigure (C) of FIG. 6 because the correction voltage ΔV is zero as indicated in subfigure (B).

The comparators 53u, 53v and 53w shown in FIG. 5 compare the voltage commands VX1 and VY1 with the triangular wave carrier in magnitude so as to generate PWM pulses. The triangular wave carrier indicated in subfigure (C) of FIG. 6 varies between 0 and VDC. The rising and the falling periods of the triangular wave carrier are defined as Tc1 and Tc0, respectively.

Comparing the voltage command VX1 with the triangular wave carrier provides the PWM signal PX whose waveform is shown in subfigure (D) of FIG. 6. An inversion signal of the PWM signal PX is the PWM signal PXn shown in subfigure (E) of FIG. 6. Likewise, comparing the voltage command VY1 with the triangular wave carrier provides the PWM signal PY (subfigure (F) in FIG. 6) and its inversion signal PYn (subfigure (G) in FIG. 6). The waveform corresponding to the line voltage of the energized phases is the difference between the PWM signals PX and PY, as illustrated in subfigure (H) of FIG. 6. In this PWM method, pulse trains are output with a frequency twice the carrier frequency.

Figure 7:
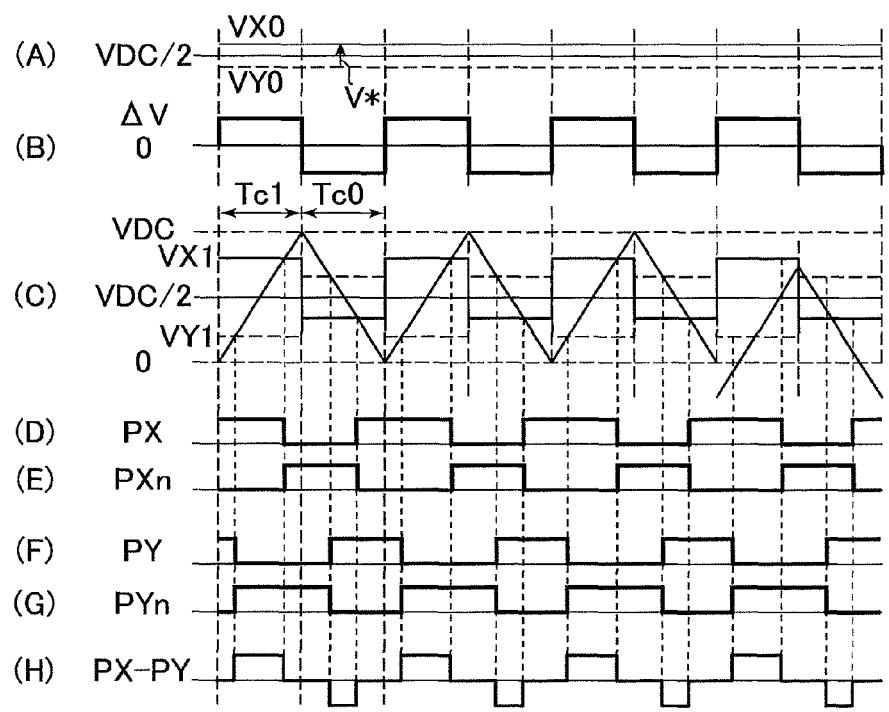
FIG. 7 is another timing chart showing operations of the voltage command correction unit and three-phase PWM generator used by the synchronous electric motor drive system as one embodiment of the present invention.

FIG. 7 shows how PWM signals are generated when the correction amount ΔV is added. It is assumed that the correction amount ΔV has a square wave synchronized with the periods of Tc1 and Tc0 of the rectangular wave carrier as illustrated in subfigure (B) of FIG. 7. As a result, the voltage commands VX1 and VY1 are given the waveforms shown in subfigure (C) of FIG. 7. The line voltage waveform turns out to be as shown in subfigure (H) of FIG. 7.

In the above-described manner characteristic of the embodiment, positive and negative pulses are added to the line voltage. Because the corrected correction amount ΔV has the average value of zero, the average value in subfigure (H) of FIG. 6 coincides with the average value in subfigure (H) in FIG. 7.

Figure 8:
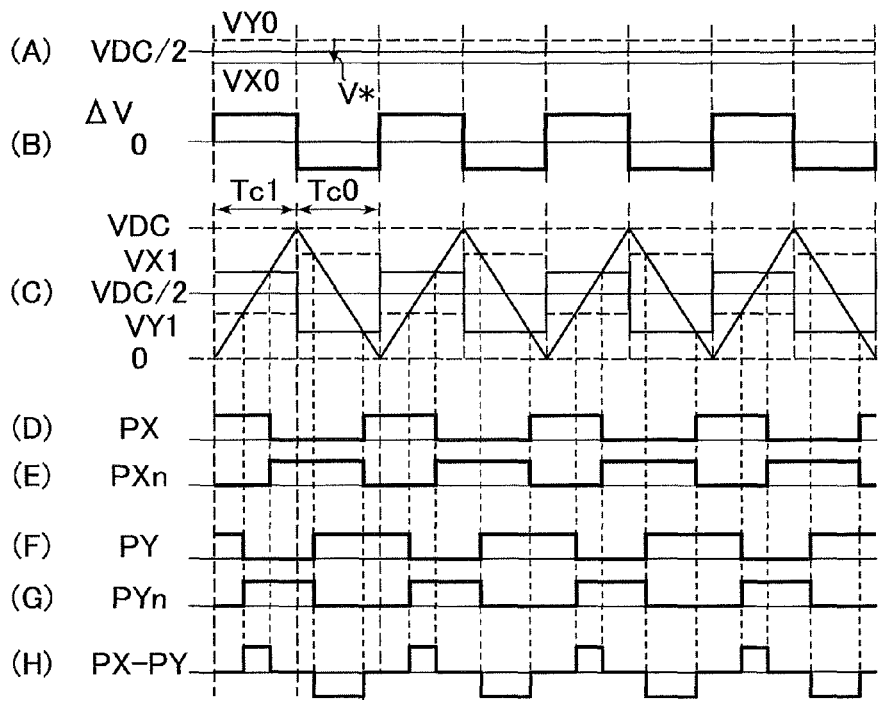
FIG. 8 is another timing chart showing operations of the voltage command correction unit and three-phase PWM generator used by the synchronous electric motor drive system as one embodiment of the present invention.

FIG. 8 shows how PWM signals are generated when the voltage command V* is a negative value. In this case, too, adding the correction amount ΔV as in the case of subfigure (B) in FIG. 7 makes it possible to apply positive and negative pulses alternately to the line voltage. Subfigure (H) of FIG. 8 confirms that because the voltage command V* is negative, the average value of the line voltage is also negative.

Figure 9:
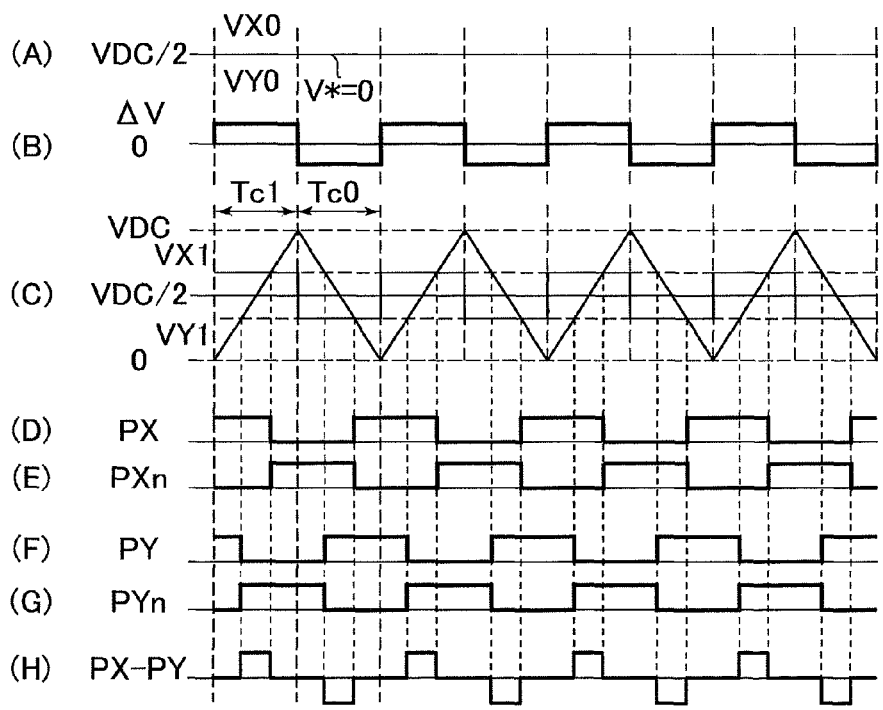
FIG. 9 is another timing chart showing operations of the voltage command correction unit and three-phase PWM generator used by the synchronous electric motor drive system as one embodiment of the present invention.

FIG. 9 shows how PWM signals are generated when the voltage command V* is zero. In this case, positive and negative pulses having the same pulse width are generated alternately for the line voltage (subfigure (H) in FIG. 9).

Explained next in reference to FIGS. 10 through 13 are three-phase. PWM signals in effect when the correction amount is varied on the voltage command correction unit.

The motor drive system requires driving the PM motor 4 in an extensive speed range covering acceleration in forward rotation from the stopped state and deceleration therefrom, as well as acceleration in reverse rotation. The foregoing paragraphs have explained the embodiment of the invention on the assumption that the motor is driven at a constant speed in a low speed range. The paragraphs that follow will explain how the motor is driven in low- to high-speed ranges.

Figure 10:
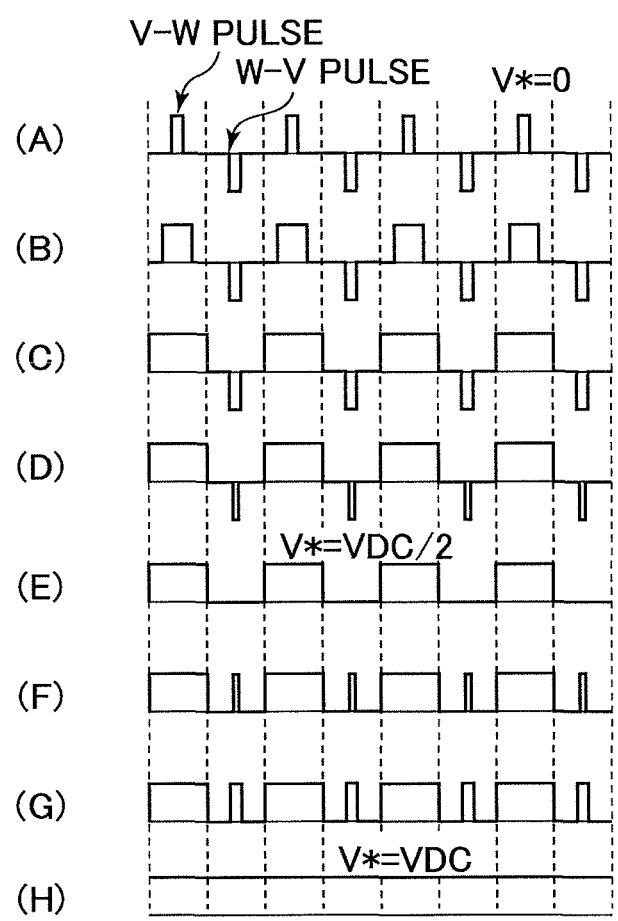
FIG. 10 is a timing chart showing three-phase PWM signals in effect when a correction amount is varied on the voltage command correction unit used by the synchronous electric motor drive system as one embodiment of the present invention.

In FIG. 10, subfigures (A) through (H) show line voltages Vvw in mode 3 represented by typical line voltage waveforms of the two energized phases. Subfigure (A) in FIG. 10 shows a line voltage waveform in effect when the voltage command V* is 0; subfigure (E) depicts a line voltage waveform in effect when the voltage command V* is half the DC voltage VDC (VDC/2); and subfigure (F) indicates a line voltage waveform in effect when the voltage command V* is equal to the DC voltage VDC. Subfigures (B) through (D), (F) and (G) in FIG. 10 illustrate line voltage waveforms each falling between the adjacent conditions.

As shown in subfigure (A) of FIG. 10, when the voltage command V* is zero, positive and negative pulses each having a minimum pulse width necessary for detecting the de-energized phase voltage are applied to the motor. As the voltage is raised, the width of positive pulses is widened while the negative pulses (V-W pulses) are each being kept to a minimum width. In the state of subfigure (C) in FIG. 10, the width of positive pulses is 50% of the full width. In this state, the motor should be rotating most probably in normal direction because the voltage is high. Thus the induced voltage of the de-energized phase in effect when negative pulses are applied is detected with regard to the voltage commands up to this state. In the states leading up to that of subfigure (C) in FIG. 10, the negative pulses are each kept to a predetermined minimum width. From the state of subfigure (D) on, the average voltage is raised gradually by making the negative pulse width narrower. In the state of subfigure (E), the negative pulses disappear. Thereafter, the positive pulse width is gradually widened in keeping with the rise in the voltage command V.

Figure 11:
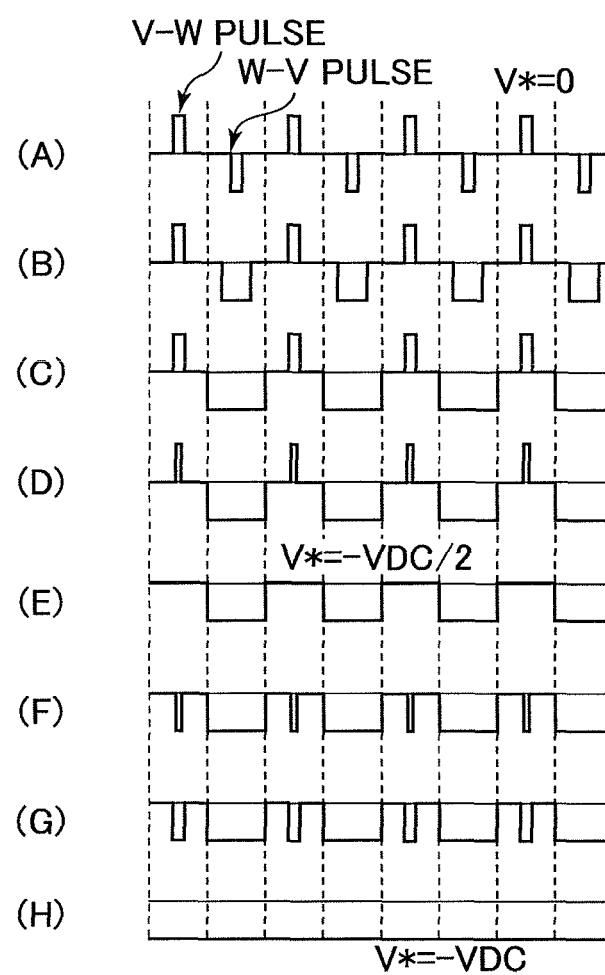
FIG. 11 is another timing chart showing three-phase PWM signals in effect when the correction amount is varied on the voltage command correction unit used by the synchronous electric motor drive system as one embodiment of the present invention.

Likewise, in the event of acceleration in reverse rotation, the negative pulse width need only be widened with the positive pulse width kept unchanged in keeping with the drop in the voltage command V*, as illustrated in FIG. 11.

The foregoing paragraphs have discussed the relation between the voltage command and the pulse waveform. Since the rotating speed of the motor is proportional to the applied voltage, the waveforms as they change from subfigure (A) to subfigure (H) in FIG. 10 are observed during an increase in the speed. In the event of acceleration in the reverse rotation direction, the waveforms as they change from subfigure (A) to subfigure (H) are acquired.

Figure 12:
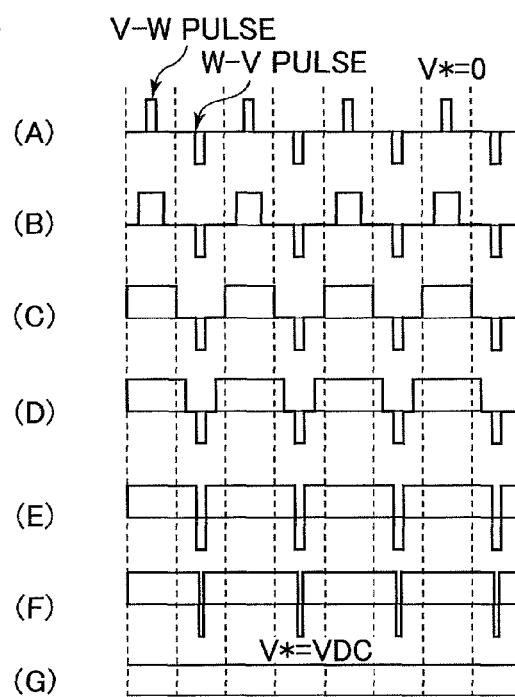
FIG. 12 is another timing chart showing three-phase PWM signals in effect when the correction amount is varied on the voltage command correction unit used by the synchronous electric motor drive system as one embodiment of the present invention.
Figure 13:
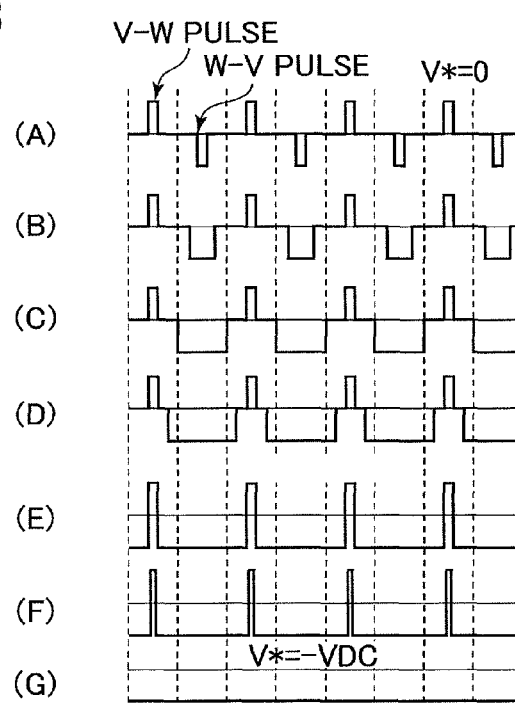
FIG. 13 is another timing chart showing three-phase PWM signals in effect when the correction amount is varied on the voltage command correction unit used by the synchronous electric motor drive system as one embodiment of the present invention.

Also, if it is desired preferentially to apply negative pulses during forward rotation or to apply positive pulses during reverse rotation, a method may be conceived that the pulse width of the negative or positive pulses is secured until the zero voltage disappears, as shown in FIGS. 12 and 13. Such arrangements are suitable for systems required to be highly responsive, such as those required to decelerate rapidly from a high rotating speed all the way to reverse revolutions.

Figure 14:
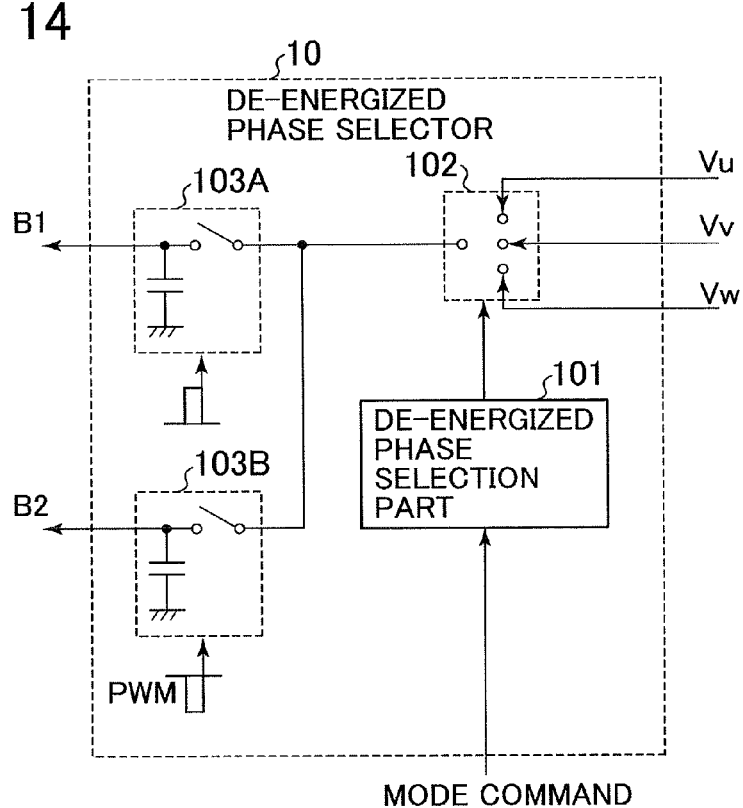
FIG. 14 is a block diagram showing a structure of a de-energized phase selector used by the synchronous electric motor drive system as one embodiment of the present invention.
Figure 15:
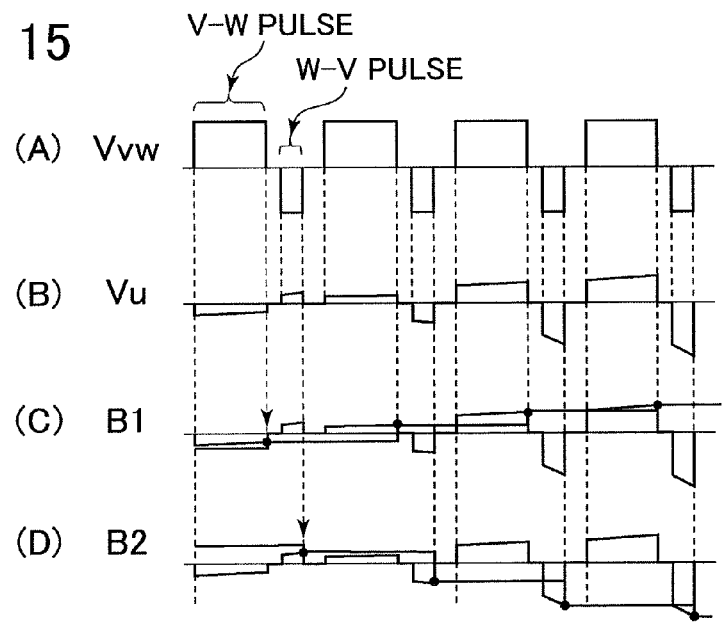
FIG. 15 is a timing chart showing operations of the de-energized phase selector used by the synchronous electric motor drive system as one embodiment of the present invention.

Explained next in reference to FIGS. 14 and 15 are the structure and operation of the de-energized phase selector 10 for use by the synchronous electric motor drive system embodying the present invention.

FIG. 14 is a block diagram showing a structure of a de-energized phase selector used by the synchronous electric motor drive system as one embodiment of the present invention. FIG. 15 is a timing chart showing operations of the de-energized phase selector used by the synchronous electric motor drive system as one embodiment of the present invention.

As shown in FIG. 14, the de-energized phase selector 10 includes a de-energized phase selection part 101 that determines which phase to select in accordance with the mode command in effect, a switch 102 that selects the de-energized phase from the three-phase voltage under control of the de-energized phase selection part 101, and sample holders 103A and 103B that sample-hold the voltage of the de-energized phase. There are two sample holders, one sample holder sampling the voltage of the de-energized phase when the positive pulse voltage is applied, the other sample holder sampling the induced voltage of the de-energized phase when the negative pulse voltage is applied, the sampled values being output as signals B1 and B2.

FIG. 15 shows waveforms of various signals in effect when the mode command is applicable to energization mode 3. Because the V and W phases are energized in energization mode 3 as shown in FIG. 2, the de-energized phase selection part 101 controls the switch 102 to select the voltage Vu of the de-energized U-phase. The selected voltage is output to the sample holders 103A and 103B.

Subfigure (B) in FIG. 15 shows the voltage Vu of the de-energized U-phase. At a falling edge of positive VW pulses shown in subfigure (A) of FIG. 15, the sample holder 103A sample-holds the voltage Vu and outputs the sampled value as the signal B1, as indicated in subfigure (C). At a rising edge of negative WV pulses shown in subfigure (A) of FIG. 15, the sample holder 103A sample-holds the voltage Vu and outputs the sampled value as the signal B2, as indicated in subfigure (D).

The signals B1 and B2 are fed to the comparators 12 and 13 (FIG. 1), respectively, for comparison with the forward rotation threshold value and reverse rotation threshold value. The relations in magnitude to the threshold values are used to determine an increase or decrease in mode. What is different from conventional setups is that the reverse rotation threshold value generator 13 and its comparator 14 are additionally provided to permit switching to the mode in the reverse rotation direction.

Figure 16:
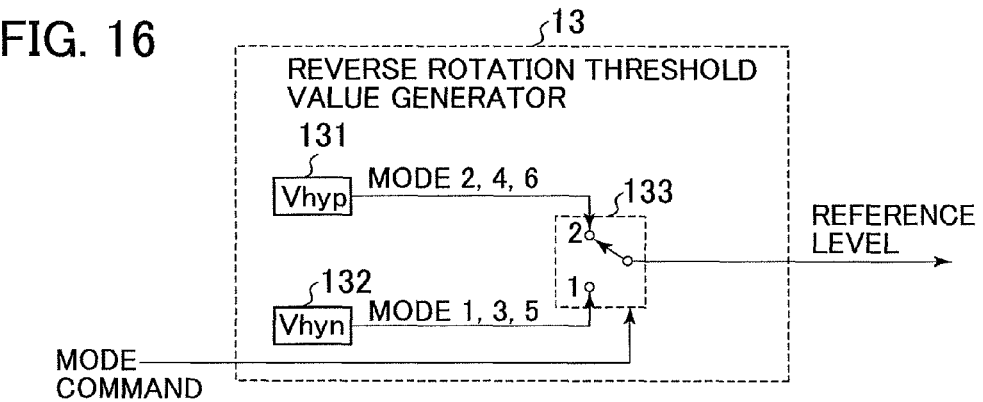
FIG. 16 is a block diagram showing a structure of a reverse rotation threshold value generator used by the synchronous electric motor drive system as one embodiment of the present invention.
Figure 17:
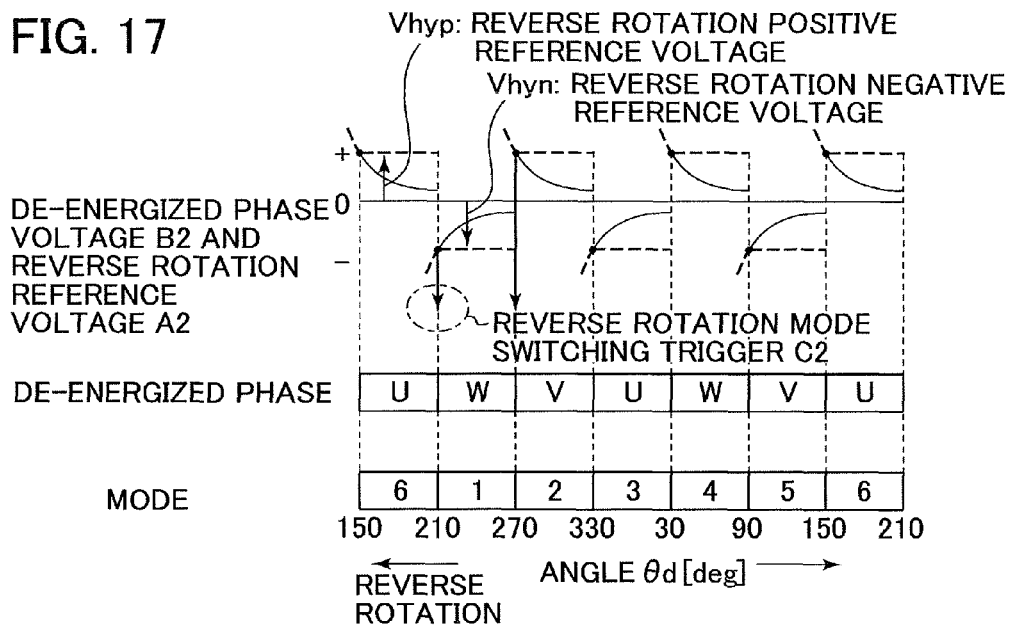
FIG. 17 is a timing chart showing operations of a comparator used by the synchronous electric motor drive system as one embodiment of the present invention.

Explained next in reference to FIGS. 16 and 17 are the structure of the reverse rotation threshold value generator 13 and the operation of the comparator 14 for use by the synchronous electric motor drive system embodying the present invention.

FIG. 16 is a block diagram showing a structure of a reverse rotation threshold value generator used by the synchronous electric motor drive system as one embodiment of the present invention. FIG. 17 is a timing chart showing operations of a comparator used by the synchronous electric motor drive system as one embodiment of the present invention.

As shown in FIG. 16, the reverse rotation threshold value generator 13 includes a reverse rotation positive reference voltage setter 131, a reverse rotation negative reference voltage setter 132, and a selector switch 133. When the mode command is 1, 3 or 5, the selector switch 133 is set to its 1 side to select as the threshold value a reference voltage Vhyp set by the reverse rotation positive reference voltage setter 131; when the mode command is 2, 4 or 6, the selector switch 133 is set to its 2 side to select as the threshold value a reference voltage Vhyn set by the reverse rotation negative reference voltage setter 132.

The comparator 14 compares the threshold value with the induced voltage of the de-energized phase so as to generate a mode switching trigger. This allows a suitable mode to be selected even if the rotor rotates in the reverse direction.

Explained next in reference to FIG. 17 is the operation of the comparator 14. FIG. 17 illustrates the energization modes and de-energized phases in effect when negative pulses are applied, and the induced voltages of the de-energized phases relative to the reference voltage.

When negative pulses are applied, de-energized phase voltages B2 are generated as shown in FIG. 17, each rising and falling repeatedly. The de-energized phase voltage B2 is output from the sample holder 103B in the de-energized phase selector 10 discussed in reference to FIG. 14.

The comparator 14 shown in FIG. 1 compares the de-energized phase voltage B2 with the reference voltage Vhyp or Vhyn. If the two voltages coincide with each other, the comparator 14 outputs a reverse rotation mode switching trigger C2 indicated in FIG. 1.

Figure 18:
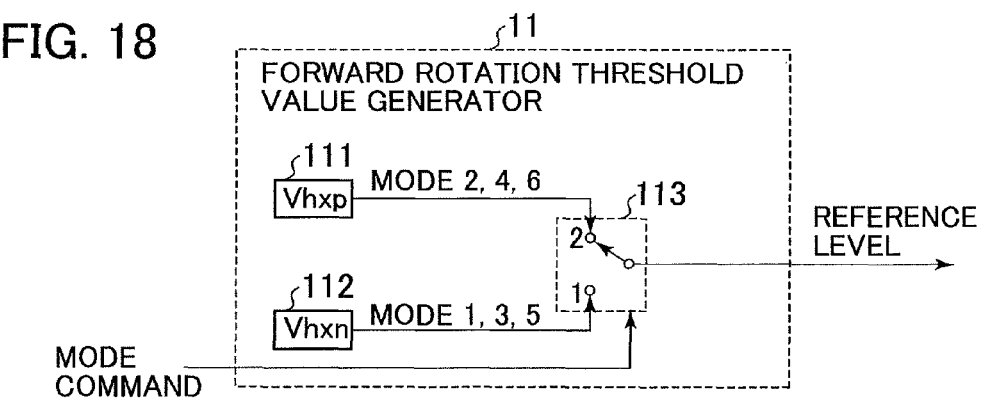
FIG. 18 is a block diagram showing a structure of a forward rotation threshold value generator used by the synchronous electric motor drive system as one embodiment of the present invention.
Figure 19:
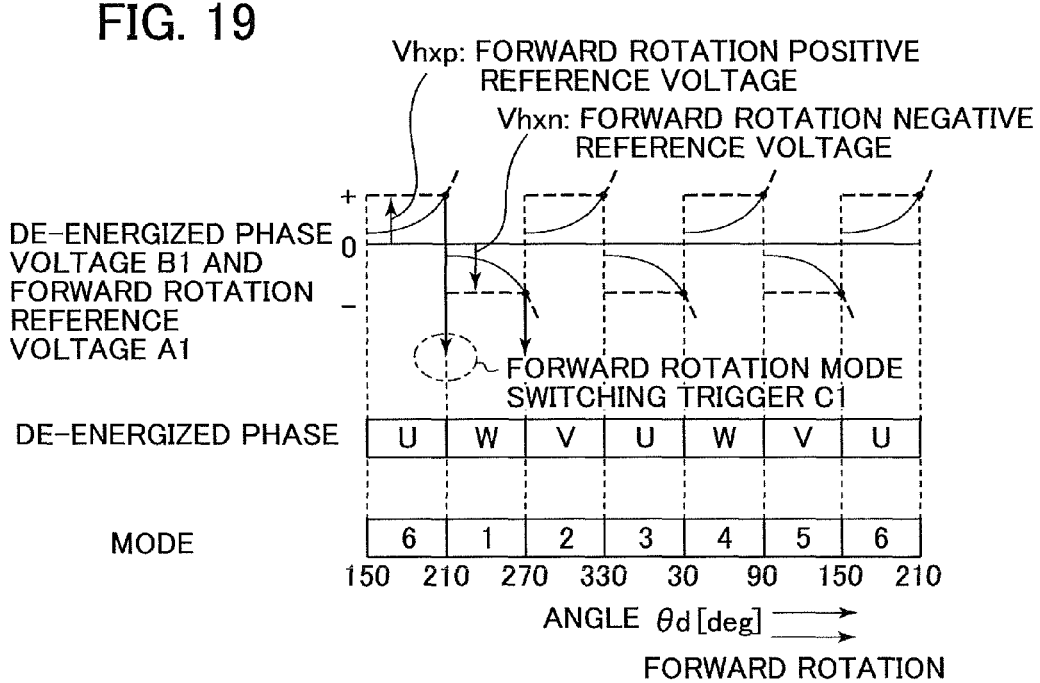
FIG. 19 is another timing chart showing operations of the comparator used by the synchronous electric motor drive system as one embodiment of the present invention.

Explained next in reference to FIGS. 18 and 19 are the structure of the forward rotation threshold value generator 11 and the operation of the comparator 12, both for use by the synchronous electric motor drive system embodying the present invention.

FIG. 18 is a block diagram showing a structure of a forward rotation threshold value generator used by the synchronous electric motor drive system as one embodiment of the present invention. FIG. 19 is a timing chart showing operations of a comparator used by the synchronous electric motor drive system as one embodiment of the present invention.

As shown in FIG. 18, the forward rotation threshold value generator 11 includes a forward rotation positive reference voltage setter 111, a forward rotation negative reference voltage setter 112, and a selector switch 113. When the mode command is 1, 3 or 5, the selector switch 113 is set to its 1 side to select as the threshold value a reference voltage Vhxp set by the forward rotation positive reference voltage setter 111; when the mode command is 2, 4 or 6, the selector switch 113 is set to its 2 side to select as the threshold value a reference voltage Vhxn set by the forward rotation negative reference voltage setter 112.

The comparator 12 compares the threshold value with the induced voltage of the de-energized phase so as to generate a mode switching trigger. This allows a suitable mode to be selected when the rotor rotates in normal direction.

Explained next in reference to FIG. 19 is the operation of the comparator 12. FIG. 19 indicates the energization modes and de-energized phases in effect when positive pulses are applied, and the induced voltages of the de-energized phases relative to the reference voltage.

When positive pulses are applied, de-energized phase voltages B1 are generated as shown in FIG. 19, each rising and falling repeatedly. The de-energized phase voltage B1 is output from the sample holder 103A in the de-energized phase selector 10 explained in reference to FIG. 14.

The comparator 12 shown in FIG. 1 compares the de-energized phase voltage B1 with the reference voltage Vhxp or Vhxn. If the two voltages coincide with each other, the comparator 12 outputs a forward rotation mode switching trigger C1 indicated in FIG. 1.

Here, the energization mode determination unit 6 shown in FIG. 1 admits two inputs: the mode switching trigger C1 output from the comparator 12, and the mode switching trigger C2 from the comparator 14.

Suppose now that in FIG. 2, the PM motor is rotating in normal direction and that the energization mode in effect at this point is 3. As discussed above, the energization modes are switched successively from 3 to 4 to 5 and so on during forward rotation and from 3 to 2 to 1 and so on during reverse rotation. Thus in this case, the moment the mode switching trigger C1 is input as a mode switching trigger for forward rotation, the energization mode determination unit 6 outputs energization mode 4 as the next forward rotation mode to the gate signal switcher 7 and mode switching trigger generator 9. On the other hand, the moment the mode switching trigger C2 is input as a mode switching trigger for reverse rotation, the energization mode determination unit 6 outputs energization mode 2 as the next reverse rotation mode to the gate signal switcher 7 and mode switching trigger generator 9.

As described above, if reverse revolutions occur during forward rotation or if reverse rotation continues, the reverse rotation threshold value generator 13 having threshold voltages (Vhyp, Vhyn) set on the positive and the negative sides thereof can generate a mode switching (i.e., mode restoring direction) trigger following comparison of the settings with the induced voltage by the comparator 14.

Figure 20:
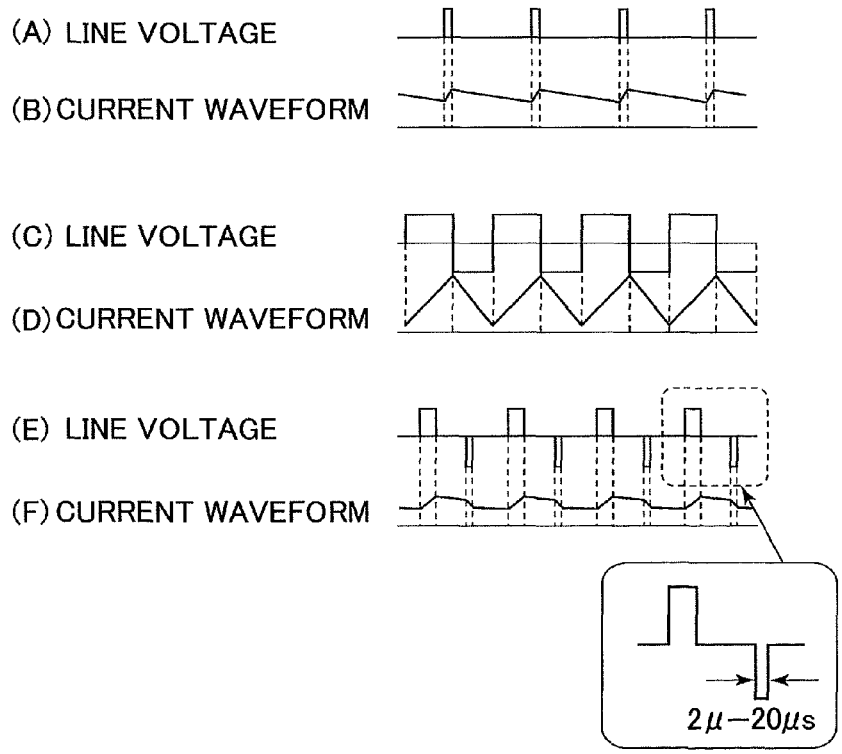
FIG. 20 is an explanatory view of the effects brought about when positive and negative pulses are applied alternately as the line voltage in the synchronous electric motor drive system as one embodiment of the present invention.

Explained next in reference to FIG. 20 are the effects brought about when positive and negative pulses are applied alternately as the line voltage in the synchronous electric motor drive system embodying the present invention.

FIG. 20 is an explanatory view of the effects brought about when positive and negative pulses are applied alternately as the line voltage in the synchronous electric motor drive system as one embodiment of the present invention.

FIG. 20 schematically shows line voltage waveforms of two energized phases and phase current waveforms in effect at the time.

In FIG. 20, subfigures (A) and (B) show a line voltage waveform and a phase current waveform of a conventional setup. As shown in subfigure (B) of FIG. 20, current ripple is observed in the current waveform due to the influence of the positive pulse voltage. As shown in subfigure (D) of FIG. 20, the current ripple becomes pronounced in voltage waveforms such as one shown in subfigure (C). With this waveform, the voltage fluctuates over a large amplitude so that a large amount of harmonic flows to the motor. This can lead to the problem about heat generation attributable to harmonic loss. Since securing the pulse width of several μs to ten-odd μs is sufficient to detect the de-energized phase voltage, the waveform in subfigure (C) of FIG. 6 contributes to nothing but raising the amount of harmonic, which results in a significant drop in efficiency.

With this embodiment, by contrast, the voltage command correction unit 8 is used to apply positive and negative pulses alternately as the line voltage to two phases in each selected energization mode as shown in subfigure (E) of FIG. 20. Also, a zero voltage is inserted between a positive and a negative pulse.

By inserting a zero voltage between positive and negative pulses, it is possible significantly to lower the amount of harmonic contained in the line voltage and thereby to reduce current ripple as shown in subfigure (F) of FIG. 20. It is also possible to minimize the pulse width necessary for negative pulses.

Generally, the pulse width of negative pulses should be made as narrow as possible in order to inhibit current ripple. Still, a certain pulse width is required for detecting the de-energized phase voltage.

Given the requirement above, this embodiment proposes making sure that the negative pulse width falls within the range of 2 μs to 20 μs inclusive. Sticking to this range prevents current ripple from growing while securing the pulse width necessary for detecting the de-energized phase voltage.

Figure 21:
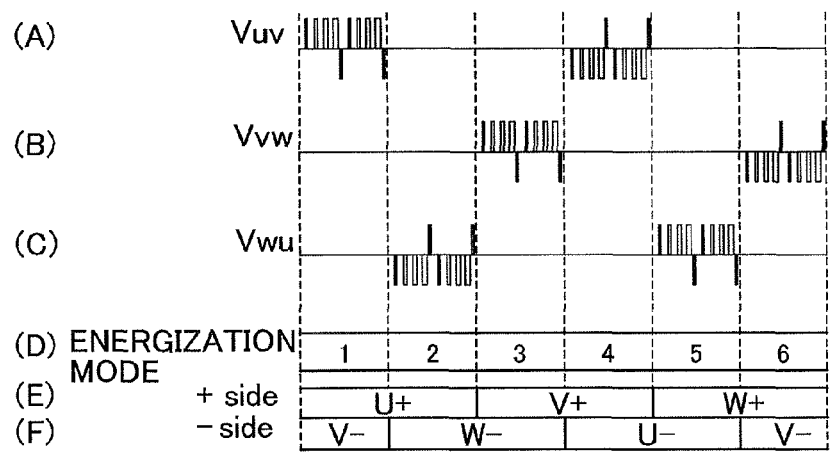
FIG. 21 is an explanatory view of another example of line voltages applied to the two phases selected in each energization mode of the synchronous electric motor drive system as one embodiment of the present invention.

Explained next in reference to FIG. 21 is another example of line voltages applied to the two phases selected in each energization mode of the synchronous electric motor drive system embodying the present invention.

FIG. 21 is an explanatory view of such an example of line voltages applied to the two phases selected in each energization mode of the synchronous electric motor drive system as one embodiment of the present invention.

In FIG. 21, subfigure (A) shows the line voltage applied to the U-phase coil Lu and V-phase coil Lv; subfigure (B) shows the line voltage applied to the V-phase coil Lv and W-phase coil Lw; and subfigure (C) shows the line voltage applied to the W-phase coil Lw and U-phase coil Lu. Subfigure (D) indicates the above-mentioned six energization modes; subfigure (E) indicates the switching elements energized on the upper arm side from among the six switching elements; and subfigure (F) indicates the switching elements energized on the lower arm side from among the six switching elements.

In the example of FIG. 2, a positive pulse, a zero voltage, a negative pulse, and a zero voltage are applied alternately as the line voltage. In order to deal with reverse rotation of the PM motor 4 here, it is necessary to apply negative pulses to the line voltage of the two energized phases. It should be noted, however, that some systems have their motors rotating only in the forward direction during normal operation. In such cases, there is no problem with negative pulses being output with low frequency as long as reverse rotation is detected as a faulty operation.

In the example shown in FIG. 21, a single negative pulse is output following the output of a plurality of positive voltage pulses. Such a waveform can be created using the voltage command correction unit 8 of the controller 2.

When the PM motor 4 is driven using the waveforms shown in FIG. 21, the amount of generated current ripple is reduced significantly. This makes it possible to implement a motor drive system that has limited harmonic loss. However, because negative pulses are inserted into the positive pulse train over a longer period than the period of the pulse train, there is a possibility that low-frequency component noise may occur as a frequency component of harmonic.

Figure 22:
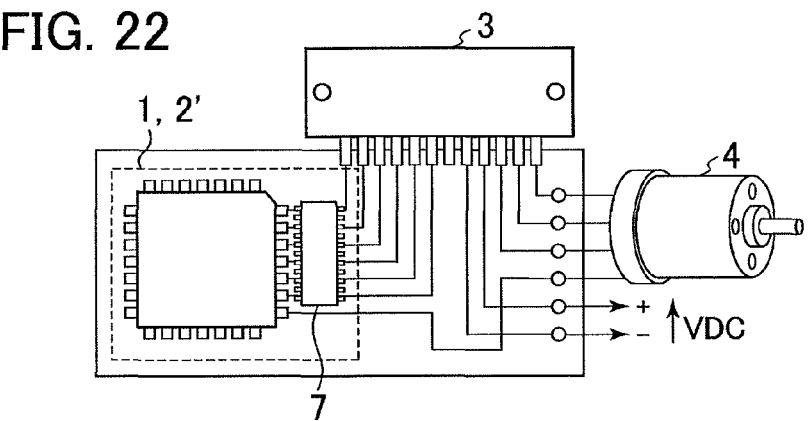
FIG. 22 is a block diagram showing a system configuration of the synchronous electric motor drive system as one embodiment of the present invention.
Figure 23:
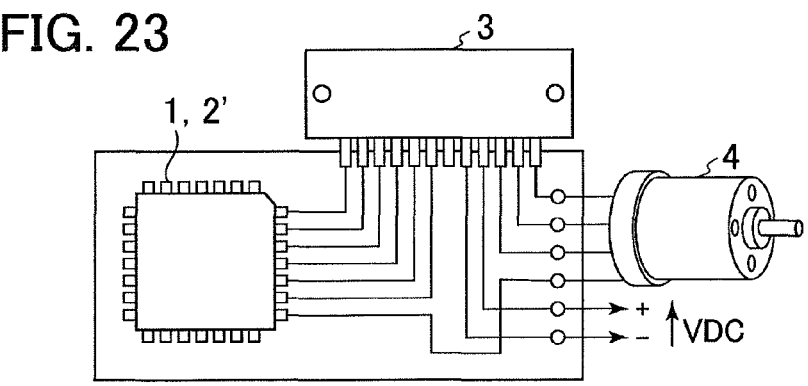
FIG. 23 is a block diagram showing another system configuration of the synchronous electric motor drive system as one embodiment of the present invention.

Explained next in reference to FIGS. 22 and 23 is the system configuration of the synchronous electric motor drive system embodying the present invention.

FIGS. 22 and 23 are block diagrams showing system configurations of the synchronous electric motor drive system as one embodiment of the present invention. In FIGS. 22 and 23, the same reference numerals as those used in FIG. 1 designate the same components.

Reference numeral 7 denotes the gate signal switcher 7 shown in FIG. 1 and made of an AND circuit. Reference numeral 1, 2' represents a portion of the V* generator 1 and of the controller 2 both shown in FIG. 1 minus the gate signal switcher 7, the portion being made of a microprocessor. A signal from the output port of the microprocessor 1, 2' determines whether the gate signal switcher 7 should enable or disable the PWM signal.

In order to apply both positive and negative pulse voltages to the motor 4, the complementary PWM function of a general-purpose microprocessor may be adopted. This poses a difficulty in generating the de-energized phase. However, the difficulty can be readily circumvented by implementing the gate signal switcher 7 using an AND circuit-based gate circuit arrangement.

Also, as shown in FIG. 23, reference numeral 1, 2 denotes a portion corresponding to the V* generator 1 and to the controller 2 both shown in FIG. 2, the portion being implemented in the form of a single digital computing unit embracing all necessary functions (e.g., single-chip microcomputer-microprocessor, DSP, dedicated gate array). The digital computing unit has the capability of performing control in such a manner that, of six gate signals output from the controller to the inverter, those signals corresponding to the two energized phase are pulses causing the upper and the lower switching elements to operate in complementary fashion and the remaining signals corresponding to the de-energized phase switch off the upper and the lower switching elements. This arrangement brings about a smaller motor drive system than before.

This invention can be applied not only to the method of using the potential of the de-energized phase voltage but also to other diverse methods such as the method of using the neutral point potential of the PM motor, the method of using a virtual neutral point potential as the reference, or the method of using as the reference the midpoint potential of the DC current of the inverter. Where the neutral point potential of the PM motor is used, the voltage involved is made lower than with the use of the potential of the de-energized phase voltage by a voltage drop due to the inductance of the coil of the de-energized phase. However, there is only one neutral point with a single wire for voltage detection whereas three points need to be wired in order to detect the potential of the de-energized phase voltage.

Figure 24:
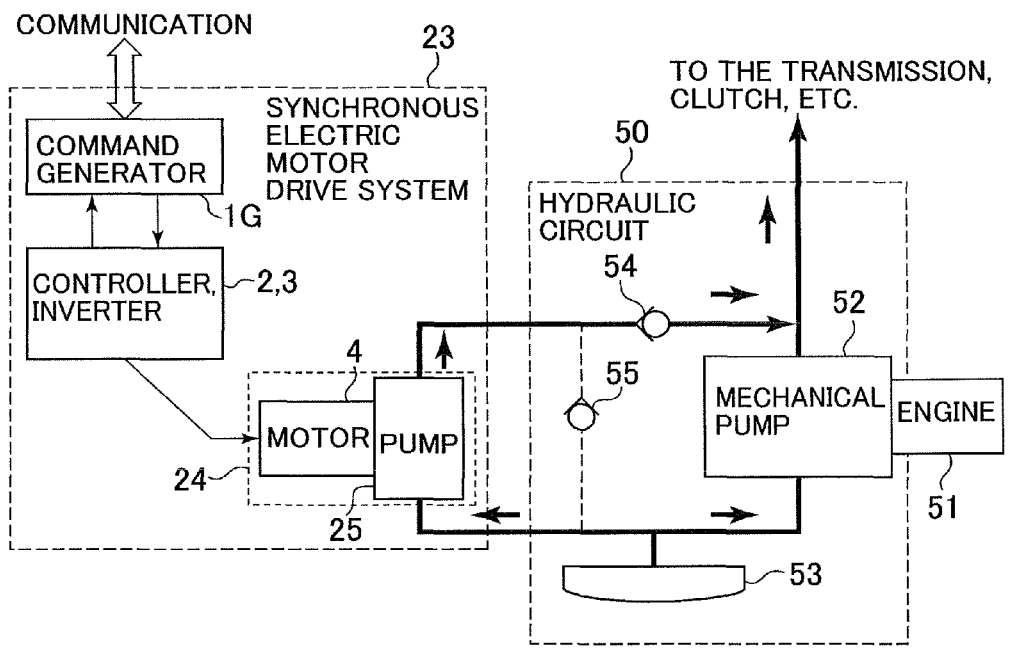
FIG. 24 is a block diagram showing a configuration of an electrically-powered hydraulic pump system that uses the synchronous electric motor drive system as one embodiment of the present invention.
Figure 25:
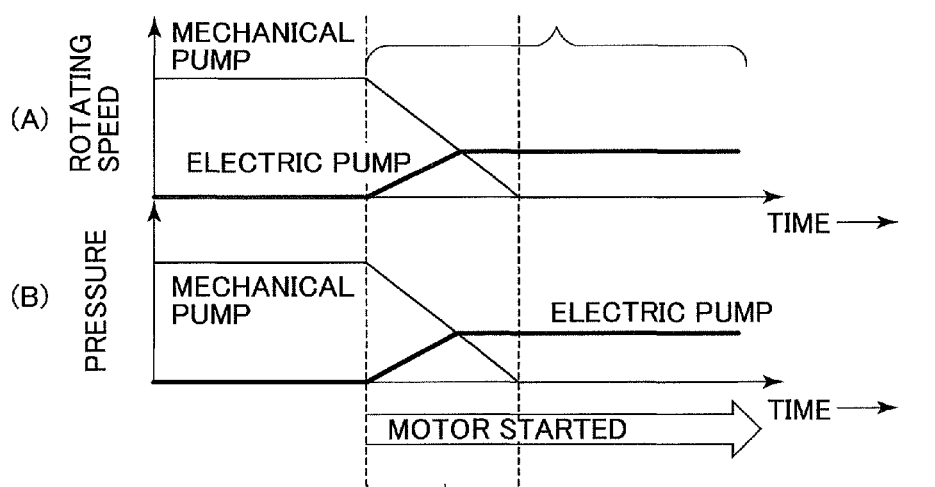
FIG. 25 is a block diagram showing another configuration of an electrically-powered hydraulic pump system that uses the synchronous electric motor drive system as one embodiment of the present invention.

Explained next in reference to FIGS. 24 and 25 is the configuration of an electrically-powered hydraulic pump system utilizing the synchronous electric motor drive system embodying the present invention.

FIGS. 24 and 25 are block diagrams showing typical configurations of an electrically-powered hydraulic pump system that uses the synchronous electric motor drive system as one embodiment of the present invention.

FIG. 24 shows an electrically-powered hydraulic pump system mounted on a vehicle and driven while the vehicle engine is being turned off in a stationary state for the purpose of idle reduction. Not only where idling is stopped but also where a hybrid vehicle or the like turns off its engine completely, this hydraulic pump system is used to secure hydraulic pressures to the transmission, clutch, and brakes.

In FIG. 24, the synchronous electric motor drive system 23 is the same as that shown in FIG. 22. The synchronous electric motor drive system 23 includes a command generator 1G, a controller 2, an inverter 3, and an electric pump 24. The electric pump 24 is made up of a motor 4 and a pump 25. While the engine is being stopped, the electric pump 24 is used to control the hydraulic pressure of a hydraulic circuit 50. The hydraulic circuit 50 is made up of a mechanical pump 52 driven by an engine 51, a tank 53 that stores oil, and a check valve 54 that prevents back currents flowing from the mechanical pump 52 to the electric pump 24.

Conventional electrically-powered hydraulic pump systems have been equipped with a relief valve 55 for keeping the hydraulic pressure below a predetermined level. The system of this invention eliminates the need for the relief valve 55.

Explained next in reference to FIG. 25 is the operation of this electrically-powered hydraulic system. In FIG. 25, subfigure (A) shows the rotating speeds of the mechanical pump and electric pump, and subfigure (B) indicates the hydraulic pressures generated by the mechanical pump and electric plump.

Where the engine is rotating with the mechanical pump generating a sufficient hydraulic pressure, the electric pump is stopped since the hydraulic pressure is being generated by the mechanical pump. When a request is made to stop idling, for example, the engine is stopped and the rotating speed is lowered simultaneously, causing the mechanical pump to start lowering its discharge pressure. Meanwhile, the electric pump is turned on and starts generating hydraulic pressure. When the discharge pressure of the electric pump becomes higher than that of the mechanical pump, the check valve 54 is opened to let the electric pump 24 secure the hydraulic pressure. In this case, the electric pump should preferably be turned on before the mechanical pump (i.e., engine) is stopped so that the hydraulic pressure generated by the electric pump has grown sufficiently high by the time the hydraulic pressure of the mechanical pump becomes lower than that of the electric pump after the engine is stopped. More specifically, the electric pump may be set to be turned on at or around the time the instruction to stop the engine is given.

When the engine is again turned on, the electric pump should preferably be driven continuously until the hydraulic pressure of the mechanical pump raised by the engine revolutions becomes higher than the hydraulic pressure of the electric pump generated while the engine was stopped. For example, the electric pump may be set to be turned on continuously until the hydraulic pressure of the mechanical pump reaches a predetermined level with the engine turned on, or may be set to operate for a predetermined time period after the engine is again turned on.

The foregoing paragraphs have outlined the electrically-powered hydraulic system. The operation of the relief value in the conventional system is explained here. As the condition for the check valve to open, the pressure of the electric pump needs to become higher than that of the mechanical pump. The pressures vary depending on the load and temperature conditions of the hydraulic circuit. In some cases, the electric pump may be overloaded. This requires opening the relief valve 55, thereby releasing the hydraulic pressure to alleviate the load of the electric pump. Without the relief valve, the motor at low speeds can rotate in reverse direction or lose steps, making it impossible for the electric motor to secure the necessary hydraulic pressure. If the discharge pressure of the electric pump disappears or becomes insufficient, the vehicle may be slow to start or may have a jerky start because of the insufficient pressure in the transmission and in the clutch at the end of the period during which idling was stopped, until the hydraulic pressure is raised sufficiently by the mechanical pump. The reason the motor loses steps and comes to a stop is the absence of the technique for estimating the rotor position at low speeds, as discussed in the cited literature. Although this problem is solved obviously by mounting rotor position sensors on the motor, this can pose new problems such as how to keep the sensors reliable and how to wire, mount and adjust the sensors.

By contrast, the synchronous electric motor drive system according to the present invention has no such problems because the rotor position can be estimated even when the motor is stopped or in reverse rotation. According to this invention, the relief valve 55 can be removed as shown in FIG. 24. As a result, the electric pump has no redundant operations so that a quiet, highly efficient electrically-powered hydraulic system is provided.

According to this embodiment explained above, with the control structure kept substantially the same as that of the conventional 120-degree energization sensorless setup, it is possible to implement driving at very low speeds in both the forward and the reverse rotation directions from the stopped state. This makes it possible, without the use of PM motor rotor position sensors, to bring about four-quadrant drive at speeds near zero, which was difficult to implement in the past, whereby the system can be made smaller in size and more reliable than ever before.

REFERENCE NUMERALS

1 V* generator
2 Controller
3 Inverter
4 Synchronous electric motor (PM motor)
5 PWM generator
6 Energization mode determination unit
7 Gate signal switcher
8 Voltage command correction unit
9 Mode switching trigger generator
10 De-energized phase potential selector
11 Forward rotation threshold value generator
12, 14 Comparator
13 Reverse rotation threshold value generator
31 DC power source
32 Inverter main circuit part
33 Output pre-driver

The invention claimed is:

1. A synchronous electric motor drive system comprising:
a three-phase synchronous electric motor;
an inverter supplying alternate-current power to the three-phase synchronous electric motor and including a plurality of switching elements, and
a controller controlling energization of the inverter through pulse width modulation in one of six energization modes by selecting two phases to be energized out of three phases of winding wires of the three-phase synchronous electric motor;
wherein the controller has an energization mode determination unit for switching the energization modes successively based on a terminal potential value detected of the de-energized phase of the three-phase synchronous electric motor or on a stator winding wire connection point potential value (neutral point potential) detected of the three-phase synchronous transmission unit;
wherein the controller has a voltage command correction unit for correcting an applied voltage command destined for the synchronous electric motor so as to supply the synchronous electric motor with a repeated waveform of a positive pulse voltage, a negative pulse voltage, and a zero voltage as a line voltage waveform of the energized phases in each of the six energization modes, the positive pulse voltage being polarized to cause the synchronous electric motor to generate a forward rotation torque, the negative pulse voltage causing the synchronous electric motor to generate a reverse rotation torque, and wherein the line voltage of the energized phases is applied to the synchronous electric motor.

2. The synchronous electric motor drive system according to claim 1, further comprising a mode switching trigger generator;

wherein the mode switching trigger generator samples the detected terminal potential value of the de-energized phase or the detected stator winding wire connection point potential value (neutral point potential) of the three-phase synchronous transmission unit in synchronism with the positive and the negative pulse voltages of the energized phases;

wherein the sampled values are compared in level with corresponding reference voltages;

wherein, based on a result of the level comparison, the mode switching trigger generator outputs a mode switching trigger signal that instructs successive switching of the energization modes between forward direction mode and reverse direction mode, and wherein the energization mode determination unit of the controller switches the energization modes successively based on the mode switching trigger signal output from the mode switching trigger generator.

3. The synchronous electric motor drive system according to claim 1, wherein the controller includes a PWM generator for performing pulse width modulation by comparing a triangular wave carrier with voltage commands corresponding to the applied voltages to the two energized phases, and wherein the voltage command correction unit generates the positive and the negative pulse voltages by applying a correction voltage to the voltage commands for the two energized phases.

4. The synchronous electric motor drive system according to claim 1, wherein the controller outputs the positive and the negative pulse voltages alternately in each of the six energization modes while outputting a zero voltage to the synchronous electric motor between pulse trains of the positive and the negative pulse voltages.

5. The synchronous electric motor drive system according to claim 4, wherein, upon gradually accelerating the synchronous electric motor from low speeds in normal direction, the controller gradually widens the pulse width of the positive pulse voltage for acceleration without changing the pulse width of the negative pulse voltage for the energized phases, before gradually narrowing the negative pulse width for acceleration in normal direction, and wherein, upon gradually accelerating the synchronous electric motor from low speeds in reverse direction, the controller gradually widens the pulse width of the negative pulse voltage for acceleration without substantially changing the pulse width of the positive pulse voltage for the energized phases, before gradually narrowing the positive pulse width for acceleration in reverse direction.

6. The synchronous electric motor drive system according to claim 1, wherein, in each of the six energization modes, the controller repeatedly applies either the positive pulse voltage and zero voltage or the negative pulse voltage and zero voltage to the synchronous electric motor while applying to the synchronous electric motor, after applying the voltages in combination a plurality of times, a pulse voltage of which the polarity is opposite the positive or the negative pulse voltage.

7. The synchronous electric motor drive system according to claim 6, wherein, upon gradually accelerating the synchronous electric motor from low speeds in normal direction, the controller gradually widens the pulse width of the positive pulse voltage for acceleration without changing the pulse width of the negative pulse voltage for the energized phases, before gradually narrowing the negative pulse width for acceleration in normal direction, and wherein, upon gradually accelerating the synchronous electric motor from low speeds in reverse direction, the controller gradually widens the pulse width of the negative pulse voltage for acceleration without substantially changing the pulse width of the positive pulse voltage for the energized phases, before gradually narrowing the positive pulse width for acceleration in reverse direction.

8. The synchronous electric motor drive system according to claim 1, wherein the controller is implemented using a microprocessor, and wherein two switching devices of which the phase corresponds to the de-energized phase of the inverter are switched off using complementary operations of a three-phase PWM function provided by the microprocessor and also using an externally attached gate array circuit.

9. The synchronous electric motor drive system according to claim 1, wherein the controller is implemented using a single-chip microcomputer, and wherein the single-chip microcomputer performs control in such a manner that, of six gate signals output from the controller to the inverter, those signals corresponding to the two energized phase are pulses causing an upper and a lower switching element to operate in complementary fashion and the remaining signals corresponding to the de-energized phase switch off the upper and the lower switching elements.

10. An electrically-powered hydraulic pump system using a synchronous electric motor, the electrically-powered hydraulic pump system comprising a synchronous electric motor drive system according to claim 1, wherein an electrically-powered hydraulic pump is driven as a load of the synchronous electric motor.

* * * * *